United States Patent
Grossman et al.

(10) Patent No.: US 12,050,467 B2
(45) Date of Patent: *Jul. 30, 2024

(54) FUEL-ECONOMY OPTIMIZATION FOR AUTONOMOUS DRIVING SYSTEMS

(71) Applicant: Waymo LLC, Mountain View, CA (US)

(72) Inventors: William Grossman, Mountain View, CA (US); Peter Strohm, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,392

(22) Filed: Apr. 3, 2023

(65) Prior Publication Data

US 2023/0315107 A1    Oct. 5, 2023

Related U.S. Application Data

(63) Continuation of application No. 17/108,891, filed on Dec. 1, 2020, now Pat. No. 11,619,944.

(51) Int. Cl.
*G05D 1/00* (2024.01)
*B60W 60/00* (2020.01)

(52) U.S. Cl.
CPC ........ *G05D 1/0217* (2013.01); *B60W 60/0021* (2020.02); *B60W 2520/10* (2013.01);
(Continued)

(58) Field of Classification Search
CPC ............ G05D 1/0217; B60W 60/0021; B60W 2555/60; B60W 2554/40; B60W 2520/10; B60W 2520/12
See application file for complete search history.

(56) References Cited

U.S. PATENT DOCUMENTS

2015/0292898 A1    10/2015  Aldereguia et al.
2018/0017398 A1*   1/2018   McNew ............ G01C 21/3453
(Continued)

FOREIGN PATENT DOCUMENTS

| CN | 104334415 A | 2/2015 |
| CN | 106767874 A | 5/2017 |
| JP | 2017061287 A | 3/2017 |

OTHER PUBLICATIONS

Office Action for Chinese Patent Application No. 202111451515.X, mailed Mar. 27, 2024, 07 Pages.

*Primary Examiner* — Peter D Nolan
*Assistant Examiner* — Mikko Okechukwu Obioha
(74) *Attorney, Agent, or Firm* — Lowenstein Sandler LLP

(57) ABSTRACT

A method includes identifying route data including a threshold arrival time for a route for an autonomous vehicle (AV) and calculating, based on the route data and a fuel-efficient speed value for each segment of the route, an estimated arrival time. Responsive to the estimated arrival time not meeting the threshold arrival time, the method includes identifying at least a subset of segments that each represent a candidate for speed increase, computing, for each segment in the subset and based on the fuel economy data, a correlation metric that indicates a correlation between a change in fuel economy and a change in speed for a corresponding segment in the subset, and increasing, for at least one segment from the subset and based on a respective correlation metric, a fuel-efficient speed value of the corresponding segment from the subset to provide a speed profile reflecting the increased fuel-efficient speed value.

20 Claims, 4 Drawing Sheets

(52) U.S. Cl.
CPC ..... *B60W 2520/12* (2013.01); *B60W 2554/40* (2020.02); *B60W 2555/60* (2020.02); *B60W 2720/10* (2013.01); *B60W 2720/12* (2013.01)

(56) References Cited

U.S. PATENT DOCUMENTS

| | | | |
|---|---|---|---|
| 2019/0004526 A1* | 1/2019 | Soliman | B60W 30/00 |
| 2022/0119020 A1* | 4/2022 | Thiyagarajan | B61L 15/0072 |
| 2022/0126826 A1* | 4/2022 | Wang | B60W 40/105 |

* cited by examiner

FUEL-ECONOMY OPTIMIZATION FOR AUTONOMOUS DRIVING SYSTEMS

RELATED APPLICATIONS

This application is a continuation of U.S. patent application Ser. No. 17/108,891, filed Dec. 1, 2020, the contents of which are incorporated by reference herein.

TECHNICAL FIELD

The instant specification generally relates to autonomous vehicles. More specifically, the instant specification relates to implementing fuel-economy optimization with respect to the autonomous vehicles.

BACKGROUND

An autonomous vehicle (AV) operates by sensing an outside environment with various sensors and charting a driving path through the environment based on the sensed data, Global Positioning System (GPS) data, and road map data. Among the autonomous vehicles are trucks used for long-distance load deliveries. The trucking industry is sensitive to various costs and, in particular, fuel costs. To improve fuel efficiency, human truck drivers use a variety of driving techniques, such as maintaining a constant speed whenever possible, accelerating through downhill sections of the road in order to acquire an additional momentum to carry the vehicle into subsequent uphill sections, and other techniques, which can be equally useful for autonomous vehicles. Successful implementation of such methods, however, can depend on the road conditions. Higher efficiency is usually achieved when traffic is light. Conversely, presence of a large number of other trucks, carrying different loads and moving with different speeds, as well as passenger cars, motorhomes, and other vehicles is often detrimental to driving performance. Challenging weather conditions can introduce further uncertainty and increase costs while negatively affecting expected delivery times.

BRIEF DESCRIPTION OF THE DRAWINGS

The disclosure is illustrated by way of examples, and not by way of limitation, and can be more fully understood with references to the following detailed description when considered in connection with the figures, in which.

SUMMARY

Figure 1:
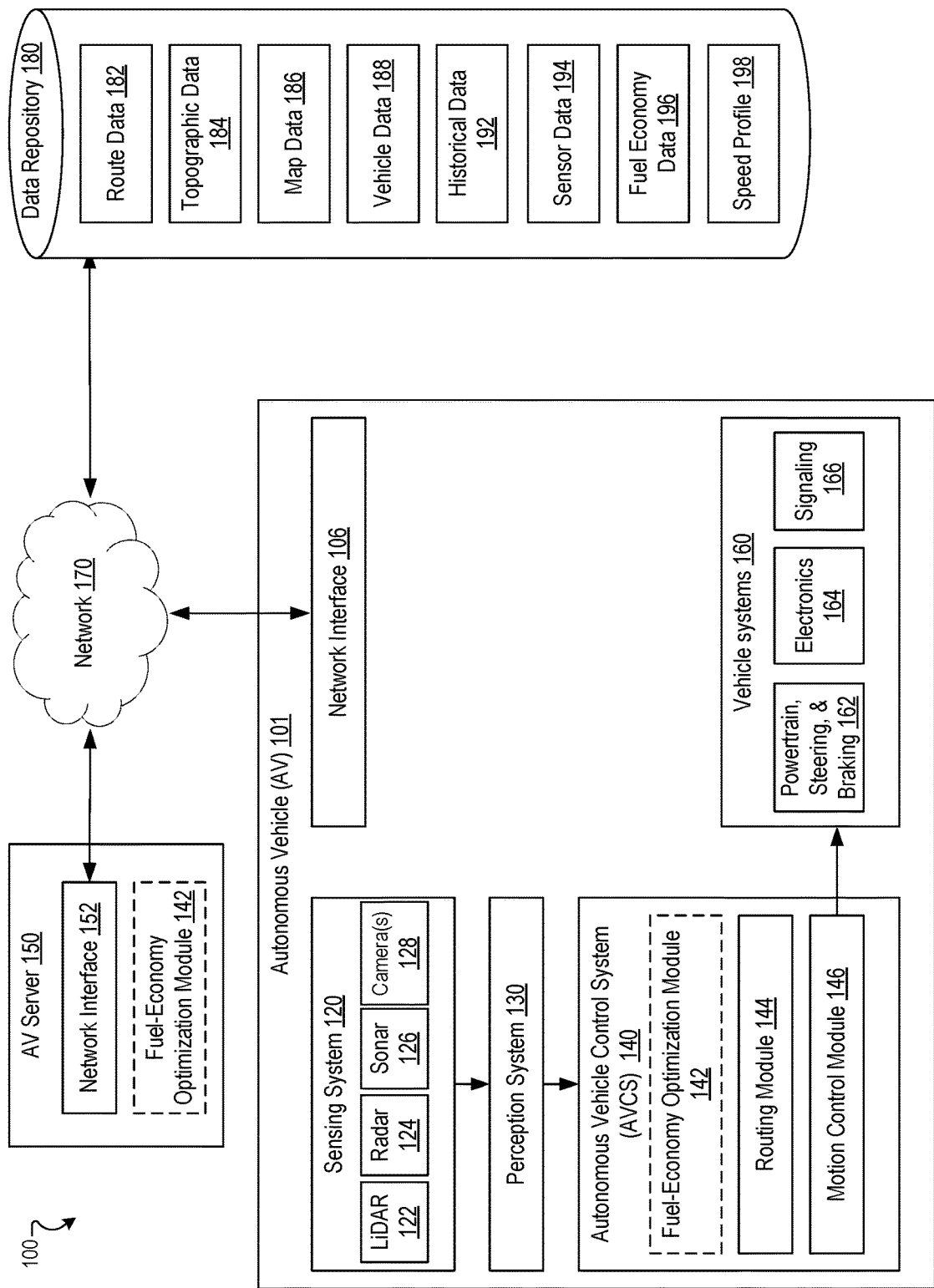
FIG. 1 is a diagram illustrating components of an example architecture of a system that provides fuel-economy optimization for an autonomous vehicle (AV), in accordance with some implementations of the disclosure.

In one implementation, disclosed is a method including identifying route data for a route for an autonomous vehicle (AV). The route data includes a threshold arrival time. The method further includes determining, by a processing device based on fuel economy data associated with the AV, a fuel-efficient speed value for each of a plurality of segments of the route. The method further includes calculating, based on the route data and the fuel-efficient speed value for each of the plurality of segments of the route, an estimated arrival time. Responsive to the estimated arrival time not meeting the threshold arrival time, the method further includes identifying, among the plurality of segments, at least a subset of segments that each represent a candidate for speed increase, computing, for each segment in the subset and based on the fuel economy data, a correlation metric that indicates a correlation between a change in fuel economy and a change in speed for a corresponding segment in the subset, and increasing, for at least one segment from the subset and based on a respective correlation metric, a fuel-efficient speed value of the corresponding segment from the subset to provide a speed profile reflecting the increased fuel-efficient speed value of the corresponding segment. The AV is to travel along the route based on the speed profile.

In another implementation, disclosed is a system including a memory device and a processing device coupled to the memory device. The processing device is to identify route data for a route for an autonomous vehicle (AV). The route data includes a threshold arrival time. The processing device is further to determine, based on fuel economy data associated with the AV, a fuel-efficient speed value for each of a plurality of segments of the route. The processing device is further to calculate, based on the route data and the fuel-efficient speed value for each of the plurality of segments of the route, an estimated arrival time. Responsive to the estimated arrival time not meeting the threshold arrival time, the processing device is further to identify, among the plurality of segments, at least a subset of segments that each represent a candidate for speed increase, compute, for each segment in the subset and based on the fuel economy data, a correlation metric that indicates a correlation between a change in fuel economy and a change in speed for a corresponding segment in the subset; and increase, for at least one segment from the subset and based on a respective correlation metric, a fuel-efficient speed value of the corresponding segment from the subset to provide a speed profile reflecting the increased fuel-efficient speed value of the corresponding segment. The AV is to travel along the route based on the speed profile.

In another implementation, disclosed is a non-transitory computer-readable storage medium having instructions stored thereon that, when executed by a processing device, cause the processing device to identify route data for a route for an autonomous vehicle (AV). The route data includes a threshold arrival time. The processing device is further to determine, based on fuel economy data associated with the AV, a fuel-efficient speed value for each of a plurality of segments of the route. The processing device is further to calculate, based on the route data and the fuel-efficient speed value for each of the plurality of segments of the route, an estimated arrival time. Responsive to the estimated arrival time not meeting the threshold arrival time, the processing device is to identify, among the plurality of segments, at least a subset of segments that each represent a candidate for speed increase, compute, for each segment in the subset and based on the fuel economy data, a correlation metric that indicates a correlation between a change in fuel economy and a change in speed for a corresponding segment in the subset, and increase, for at least one segment from the subset and based on a respective correlation metric, a fuel-efficient speed value of the corresponding segment from the subset to provide a speed profile reflecting the increased fuel-efficient speed value of the corresponding segment. The AV is to travel along the route based on the speed profile.

DETAILED DESCRIPTION

A vehicle (e.g., truck) uses a significant amount of fuel. Fuel costs may be a third of the total cost of operating trucks (e.g., commercial class 8 trucks). At some portions of routes (e.g., uphill grade), a vehicle consumes more fuel than other portions of the route (e.g., flat or downhill grades, etc.).

Travel speed is one factor that can have a disproportionate impact on fuel economy. Fuel economy represents a measure of correspondence (e.g., a ratio, percentage, etc.) between the amount of fuel (or other type of energy) consumed by a vehicle and distance traveled by the vehicle. Traveling slower may increase fuel economy. There are constraints on lower speed bounds, such as legal speed limits and arrival time windows that may cause a vehicle to travel faster than what is optimal. A legal speed limit (also referred to herein as a regulatory speed limit) may be a maximum or minimum speed set for a given stretch of a road by a respective legislative body. Arrival time windows can include a time by which a vehicle is to arrive at a destination (e.g., cargo delivery deadline), hours of service, avoiding travelling at certain times (e.g., not driving at night), and/or the like. To meet the arrival time window, a vehicle may travel at faster-than-optimal speeds for different portions of the route.

Conventionally, a vehicle travels at a set speed (e.g., via a cruise control system) to meet an arrival time window (e.g., set cruise control speed at 60 miles per hour to arrive in one hour at a destination that is 60 miles away). By using a set speed to travel along a route that has variations (e.g., differences in grade), a vehicle may have a less-than-optimal fuel economy. At some portions of the route (e.g., uphill grades), the vehicle may have a worse fuel economy than other portions of the route (e.g., flat or downhill grades).

Aspects of the disclosure address the above challenges along with others, by generating a speed profile that includes verified fuel-efficient speed values for segments of a route for controlling an autonomous vehicle (AV). An AV performs vehicle actions, such as braking, steering, and throttling, to move the AV from the starting location to the destination location along the route.

A processing device (e.g., hosted by a server or onboard the AV) can identify route data including a threshold arrival time for a route of the AV. The threshold arrival time (e.g., arrival time window) can include a time by which the AV should arrive at a destination (e.g., cargo delivery deadline), a maximum trip time and departure time, and/or the like.

The processing device can determine, based on fuel economy data associated with the AV, a fuel-efficient speed value for each segment of the route. The fuel economy data can include input values and output values. The input values can include speed values (e.g., miles per hour (mph)), grade values (e.g., uphill grade, downhill grade), total AV mass values, wind values, and/or the like. The output values can include fuel economy values (e.g., miles per gallon (mpg)) resulting from one or more AVs driving based on the input values (e.g., fuel economy values collected from one or more AVs while driving at different speed values, etc.). For example, the fuel economy data may indicate that for a grade value of a segment of a route, total mass value of the AV, and a historical wind value of the segment, the greatest fuel economy value (e.g., highest mpg) may correspond to a fuel-efficient speed value of 30 mph.

The processing device can verify whether the fuel-efficient speed value for each segment of the route corresponds to regulatory speed limits and traffic data. As part of the verification, the processing device can update fuel-efficient speed values of the segments of the route if needed, and include the verified fuel-efficient speed values in the speed profile. For example, if, based on the fuel economy data and input values, the fuel-efficient speed value (e.g., speed value with the highest mpg) for a segment is 20 mph, but the regulatory minimum speed limit is 30 mph for the segment, the processing device can increase the fuel-efficient speed value from 20 mph to 30 mph for use in the speed profile. In another example, if, based on the fuel economy data and input values, the fuel-efficient speed value for a segment is 50 mph, but based on historical traffic data, the maximum threshold speed value for the segment is 40 mph, the processing device can decrease the fuel efficient speed value from 50 mph to 40 mph for use in the speed profile.

The processing device can calculate, based on the route data and the corresponding fuel-efficient speed value for each of the segments, an estimated arrival time. The estimated arrival time may be based on a total travel time. The total travel time may be determined by adding together the segment travel time of each segment of the route. The segment travel time may be calculated by dividing a distance value of each segment by the fuel-efficient speed value for the segment (e.g., 30 miles divided by 30 mph would equal 1 hour). The estimated arrival time may also include buffer time.

The processing device can determine whether the estimated arrival time meets the threshold arrival time. Responsive to the estimated arrival time not meeting the threshold arrival time, the processing device can identify at least a subset of segments of the route that each represent a candidate for speed increase (e.g., if the fuel-efficient speed value for the candidate segments does not meet a regulatory maximum speed limit or a historical maximum speed value based on traffic data). The processing device can compute, for each segment in the subset and based on the fuel economy data, a correlation metric that indicates a correlation between a change in fuel economy (e.g., change in mpg) and a change in speed (e.g., change in mph) for a corresponding segment in the subset. For example, based on the fuel economy data, the processing device may determine that an increase of 1 mph for a segment generates a decrease of 2 mpg for the segment. The correlation metric may indicate a −2 mpg for +1 mph (e.g., −2 mpg/mph or −0.5 mph/mpg). Different segments of the route may have different correlation metrics (e.g., −3, −2, −1, 0, etc. change in mpg per 1 mph increase). The processing device can increase, for at least one segment from the subset and based on a respective correlation metric, a fuel-efficient speed value of a corresponding segment from the subset to provide a speed profile reflecting the increased fuel-efficient speed value for the corresponding segment. For example, if different segments have a decrease of 3 mpg, decrease of 2 mpg, and decrease of 1 mpg for an increase in 1 mph, the processing device may determine that the segment with the decrease of 1 mpg for an increase in 1 mph has the lowest decrease in fuel economy. The processing device may then increase the fuel-efficient speed value for that segment to provide a speed profile reflecting the increased fuel-efficient speed value for that segment. The resulting speed profile can then be used by the AV to travel along the route.

Aspects and implementations disclosed herein provide numerous advantages over existing technologies. By generating a speed profile that includes verified fuel-efficient speed values for controlling an AV along a route, fuel consumption of the AV can be optimized while still allowing the AV to arrive by the threshold arrival time. In some implementations, the speed profile can include additional information, such as a corresponding gear, braking system, etc. to use for each segment of the route, to further improve fuel consumption and reduce wear and tear on the AV. By improving fuel consumption, use of the speed profile can further result in less air pollution, while still meeting regulatory speed limits and threshold arrival times.

FIG. 1 is a diagram illustrating components of an example architecture 100 of a system that provides fuel-economy optimization for an autonomous vehicle (AV) 101, in accordance with some implementations of the disclosure. In some implementations AV 101 is a long haul AV truck (e.g., commercial class 8 truck). Although alternatively referred to as "trucks," autonomous vehicles can include any motor vehicles, such as cars, tractors (with or without trailers), buses, motorcycles, all-terrain vehicles, recreational vehicles, any specialized farming or construction vehicles, and the like), or any other self-propelled vehicles capable of being operated in a self-driving mode (without a human input or with a reduced human input). Autonomous vehicles can include vehicles with various levels of autonomy, such as level 2 (partial autonomy) through level 5 (full autonomy). Autonomous vehicles can include vehicles using an internal combustion engine (e.g., gas engine, diesel engine, etc.), an electric engine (motor), or combination thereof (e.g., hybrid AV). AV 101 can be capable of traveling on paved and/or unpaved roadways, off-road, on various surfaces encountered on farming (or other agricultural) land, within a driving environment (including indoor environment) of an industrial plant, and so on.

AV 101 can include a sensing system 120. The sensing system 120 can include various electromagnetic (e.g., optical) and non-electromagnetic (e.g., acoustic) sensing subsystems and/or devices that can be used in object sensing to facilitate autonomous driving, e.g., distance sensing, velocity sensing, acceleration sensing, rotational motion sensing, and so on. For example, optical sensing can utilize a range of light visible to a human eye (e.g., the 380 to 400 nanometer (nm) wavelength range), the UV range (below 380 nm), the infrared range (above 400 nm), the radio frequency range (above 1 m), etc. In implementations, "optical" can include any other suitable range of the electromagnetic spectrum.

The sensing system 120 can include one or more LiDAR sensors 122 (e.g., a LiDAR rangefinders), which can be laser-based units capable of determining distances (e.g., using time-of-flight (ToF) technology) to the objects in the environment around AV 101. For example, LiDAR sensor(s) 122 can emit one or more laser signals (pulses) that travel to an object and then detect arrived signals reflected from the object. By determining a time delay between the signal emission and the arrival of the retro-reflected waves, a ToF LiDAR sensors 122 can determine the distance to the object. LiDAR sensor(s) 122 can emit signals in various directions to obtain a wide view of the outside environment. LiDAR sensor(s) 122 can utilize wavelengths of electromagnetic waves that are shorter than the wavelength of the radio waves and can, therefore, provide a higher spatial resolution and sensitivity compared with the radar unit 124. In some implementations, LiDAR sensor(s) 122 can be (or include) coherent LiDAR sensor(s), such as a frequency-modulated continuous-wave (FMCW) LiDAR sensor(s). FMCW LiDAR sensor(s) (or some other coherent LiDAR sensors) can use optical heterodyne detection for instant velocity determination. LiDAR sensor(s) 122 can include one or more laser sources producing and emitting signals and one or more detectors of the signals reflected back from the objects, one or more spectral filters to filter out spurious electromagnetic waves having wavelengths (frequencies) that are different from the wavelengths (frequencies) of the emitted signals, one or more directional filters (e.g., apertures, diffraction gratings, and so on) to filter out electromagnetic waves that arrive at the detectors along directions different from the directions of the emitted signals, and other components that can enhance sensing capabilities of the LiDAR sensor(s) 122. In some implementations, LiDAR sensor(s) 122 can ensure a 360-degree view in a horizontal direction and up to 90 degrees in the vertical direction.

The sensing system 120 can include one or more radar units 124, which can be any system that utilizes radio or microwave frequency signals to sense objects within the driving environment of the AV 101. The radar unit(s) 124 can be configured to sense both the spatial locations of the objects (including their spatial dimensions) and their velocities (e.g., using the Doppler shift technology), such as translational velocities and angular (rotational) velocities. Sensing system 120 can also include one or more sonars 126, which can be ultrasonic sonars, in some implementations.

Sensing system 120 can further include one or more cameras 128 to capture images of the driving environment. The images can be two-dimensional projections of the driving environment (or parts of the driving environment) onto a projecting plane (flat or non-flat, e.g. fisheye) of the cameras. Some of cameras 128 of sensing system 120 can be video cameras configured to capture a continuous (or quasi-continuous) stream of images of the driving environment.

The sensing data obtained by sensing system 120 can be processed by a perception system 130 that can be configured to detect and track objects in the driving environment and to identify the detected objects. For example, perception system 130 can analyze images captured by cameras 128 and can be capable of detecting traffic light signals, road signs, roadway layouts (e.g., boundaries of traffic lanes, topologies of intersections, designations of parking places, and so on), presence of obstacles, and the like. Perception system 130 can further receive the LiDAR sensing data (coherent Doppler data and incoherent ToF data) to determine distances to various objects in the environment and velocities of such objects. In some implementations, perception system 130 can use the LiDAR data in combination with the data captured by the camera(s) 128. In one example, the camera(s) 128 can detect an image of a rock partially obstructing a traffic lane. Using the data from the camera(s) 128, the perception system 130 can be capable of determining the angular size of the rock, but not the linear size of the rock. Using the LiDAR data, perception system 130 can determine the distance from the rock to the AV and, therefore, by combining the distance information with the angular size of the rock, perception system 130 can determine the linear dimensions of the rock as well.

In another implementation, using the LiDAR data, perception system 130 can determine how far a detected object is from the AV and can further determine the component of the object's velocity along the direction of the AV's motion. Furthermore, using a series of quick images obtained by the camera, perception system 130 can also determine the lateral velocity of the detected object in a direction perpendicular to the direction of the AV's motion. In some implementations, the lateral velocity can be determined from the LiDAR data alone, for example, by recognizing an edge of the object (using horizontal scanning) and further determining how quickly the edge of the object is moving in the lateral direction.

Perception system 130 can further receive information from a GPS transceiver (not shown) configured to obtain information about the position of the AV relative to Earth and use the GPS data in conjunction with the sensing data to help accurately determine location of the AV with respect to fixed objects of the driving environment, such as roadways, lane boundaries, intersections, sidewalks, crosswalks, road signs, surrounding buildings, and so on, locations of which can be provided by map information accessible by perception system 130. In some implementations, perception system 130 can receive non-electromagnetic data, such as sonar data (e.g., ultrasonic sensor data), temperature sensor data, pressure sensor data, meteorological data (e.g., wind speed and direction, precipitation data), or other environmental monitoring data.

In some implementations, the perception system 130 can provide, generate, or be used to help generate sensor data 194 (e.g., environmental sensing data, scenario sensing data, GPS data, etc.) pertaining to a route of a vehicle. Herein "route" refers to a sequence of physical locations (e.g., geographic markers) that can be traveled by a target vehicle between a starting point ("start") and a destination point ("destination"). The start and/or the destination need not be the initial and final locations of the vehicle in the driving mission, but can be any two points (e.g., A and B) along such a mission. Accordingly, "mission" herein refers to any portion of the overall driving task.

Route data 182 can include information about the starting point, intermediate points and destination point of the route (e.g., longitude and latitude information of points along the route) and include physical characteristics of various routes. "Trajectory" refers to driving settings, specified for various locations along the route, and includes speed, throttle, brake, etc. control that determine progression of the vehicle along the route. For example, a trajectory can include throttle settings, T(L) as a function of the location L along the route, target speed of the vehicle S(L), gear selection sequences, and so on. The location L can be identified by the distance travelled, GPS coordinates, road markers (e.g., mileposts), or a combination thereof, or in any other way.

Topographic data 184 can include information about the topography of the roads (e.g., grade and radius of curvature, pitch, elevation, etc.) or topography along the route.

Map data 186 can include information about the road network along the route, such as the quality of road surfaces, number of lanes, regulatory speed limits (e.g., regulatory maximum speed limits, regulatory minimum speed limits), type and number of exit ramps, availability of gas stations, and so on. Map data 186 can also include traffic data that includes information about historic traffic patterns or current traffic conditions along or near the route.

Vehicle data 188 can include data about the AV 101. Vehicle data 188 can be physical vehicle data, such as total mass of the AV 101, braking capabilities of the AV (e.g., regenerative braking, friction braking, engine braking, downshifting, exhaust braking, using drive line retarders, etc.), transmission gear ratios of the AV, wheelbase data of the AV, engine capabilities of the AV, lateral dynamics data (e.g., how the AV reacts to winding roads), etc.

Historical data 192 can include data, such as recommended lane data (e.g., to merge, historically it is better to be in a certain lane), historical wind data (e.g., particular road segments historically have a particular speed and direction of wind), traffic data (e.g., historically a certain amount of traffic at particular road segments at particular times or days, historically vehicles are at a particular speed on particular road segments at particular times or days, etc.). In some implementations, the historical data 192 is collected from AVs 101 over time (e.g., via sensing system 120, via perception system 130, sent to AV server 150, etc.). The historical data 192 can be used as predictive data about future scenarios. For example, sensor data 194 can indicate that another vehicle is in an adjacent lane and has an engaged turn signal, the historical data 192 can include information indicating that historically, the vehicle will enter the same lane that AV 101 currently occupies in 3 seconds and will be approximately 3 meters in front of the AV 101 at that time.

In some implementations, the wind data is sensor data (e.g., from flow rate sensors, pressure sensors) from one or more AVs 101. In some implementations, the wind data is from a weather report. In some implementations, the fuel-economy optimization module 142 calculates the wind data based on speed values, steering input values, and throttle input values one or more AVs 101 over time compared to steady state values of AVs 101.

Sensor data 194 (e.g., environmental sensing data) can include data obtained by sensing system 120 and/or include data from the perception system 130 that has been generated using the data from the sensing system 120. For example, sensor data 194 (e.g., environmental sensing data) can include information describing the environment of or proximate the AV 101 (e.g., position of other vehicles, obstacles, or other elements with respect to the AV 101).

Fuel economy data 196 can include input values and output values. The output values may be collected by AVs driving based on the input values. The input values can include one or more of speed values (e.g., mph), total AV mass values, wind values, grade values, road curvature values, etc. The output values can include fuel economy values (e.g., mpg). For example, the fuel economy data 196 may indicate that at a particular speed, particular total AV mass, wind, grade, and road curvature, AVs had a particular average fuel economy (e.g., mpg).

In some implementations, the fuel economy data 196 further indicates transmission gear (e.g., input or output value), braking system (e.g., input or output value), etc. For example, the fuel economy data 196 may indicate that at a particular speed and transmission gear, AVs had a particular average fuel economy. In another example, the fuel economy data 196 may indicate that for a particular downhill grade, a particular total AV mass, and a particular radius of curvature, AVs had a particular average fuel economy and used a particular braking system.

In some implementations, a first portion of the input and output values in the fuel economy data 196 is collected (e.g., based on sensor data 194, vehicle data 188, topographic data 184, etc.) and a second portion of the input and output values in the fuel economy data 196 is estimated (e.g., extrapolated, etc.) based on the first portion of input and output values. For example, if fuel economy values collected at 30 mph and at 35 mph are the same for an AV, the fuel economy data 196 may indicate that from 30 mph to 35 mph, the fuel economy values are the same.

The fuel economy data 196 can be included in a file (e.g., text file), a table (e.g., a lookup table), or any other data structure.

Speed profile 198 can include a speed value for each segment of a route. In some implementations, the speed profile 198 includes additional information (e.g., transmission gear to use, braking system to use, acceleration value, deceleration value, etc.) for one or more segments of the route (e.g., instead of or in addition to the speed value for each segment of the route). In some implementations, the speed profile 198 is a file (e.g., text file). In some implementations, the speed profile 198 is embedded in other data (e.g., map data 186, route data 182, etc.).

The data generated by perception system 130 as well as various additional data (e.g., GPS data, route data 182, topographic data 184, map data 186, vehicle data 188, historical data 192, sensor data 194, fuel economy data 196, speed profile 198, and the like) can be used by an autonomous driving system, such as AV 101 control system (AVCS 140). The AVCS 140 can include one or more algorithms that control how AV 101 is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as vehicle systems 160 (e.g., the powertrain, steering and braking 162, vehicle electronics 164, and signaling 166), and other systems and components not explicitly shown in FIG. 1. The powertrain, steering and braking 162 can include an engine (internal combustion engine, electric engine (motor), and so on), transmission (e.g., transmission gears), differentials, axles, wheels, steering mechanism, braking mechanism, and other systems. The vehicle electronics 164 can include an on-board computer, engine management, ignition, communication systems, carputers, telematics, in-car entertainment systems, and other systems and components. The signaling 166 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, steering and braking 162 (or signaling 166), whereas other instructions output by the AVCS 140 are first delivered to the electronics 164, which can generate commands to the powertrain, steering and braking 162 and/or signaling 166.

In one example, the AVCS 140 can determine that an obstacle identified by perception system 130 is to be avoided by decelerating the vehicle until a safe speed is reached, followed by steering the vehicle around the obstacle. The AVCS 140 can output instructions to the powertrain, steering and braking 162 (directly or via the electronics 164) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain, steering and braking 162 (directly or via the electronics 164) to resume the previous speed settings of the vehicle.

In some implementations, architecture 100 can also include AV server 150 to communicate relevant information to and receive relevant information from AV 101. For example, relevant information can include traffic information, weather information, route information, among other information. In some implementations, AV server 150 can be, at least at times, communicating with AV 101 via network 170. In some implementations, AV 101 can be connected to network 170 at most or all times. In some implementations, AV 101 can establish connections to network 170 intermittently, when an appropriate network signal is available. In some implementations, AV 101 can be connected to network 170 prior to starting the driving mission. Network 170 can use a wireless connection, such as a broadband cellular connection (e.g., 3G, 4G, 4G LTE, 5G, connection(s), and so on), a wireless local area network (WLAN), a wireless wide area network (WWAN), a wired connection, a satellite connection, or the like. Connection to network 170 can be facilitated via a network interface 106 (on the side of AV 101) and a network interface 152 (on the side of AV server 150). Network interfaces 106 and 152 can include antennas, network controllers, radio circuits, amplifiers, analog-to-digital and digital-to-analog converters, physical layers (PHY), media access control layers (MAC), and the like.

In some implementations, architecture 100 can also include a data repository 180. In some implementations, the data repository 180 is memory (e.g., random access memory), a drive (e.g., a hard drive, a flash drive), a database system, or another type of component or device capable of storing data. In some implementations, data repository 180 includes multiple storage components (e.g., multiple drives or multiple databases) that span multiple computing devices (e.g., multiple server computers). In some implementations, the data repository 180 stores one or more of route data 182, topographic data 184, map data 186, vehicle data 188, historical data 192, sensor data 194, fuel economy data 196, speed profile 198, and the like. In some implementations, at least a portion of the data shown in FIG. 1 as being stored in data repository 180 is stored in AV server 150 and/or AV 101.

In some implementations, architecture 100 includes a fuel-economy optimization module 142. In some implementations, the fuel-economy optimization module 142 is hosted by the AV server 150. In some implementations, the fuel-economy optimization module 142 is hosted by the AV 101 (e.g., in AVCS 140). In some implementations, the AVCS 140 includes one or more of fuel-economy optimization module 142, routing module 144, and/or motion control module 146.

In some implementations, the routing module 144 identifies data, such as route data 182, map data 186, and sensor data 194, and generates, based on the data, instructions (e.g., short time horizon routing data). For example, routing module 144 receives route data 182 indicating that the AV 101 is to travel along a particular road, map data 186 indicating regulatory speed limits of the particular road, and sensor data 194 indicating locations of vehicles and/or objects proximate the AV 101. The routing module 144 generates, based on the route data 182, map data 186, and sensor data 194, instructions (e.g., commands, short time horizon routing data) of vehicle actions of the AV 101 for the next interval (e.g., 10 seconds). The routing module 144 transmits the instructions to the motion control module 146 and the motion control module 146 controls one or more of the actuators (e.g., the vehicle systems 160) of the AV 101 based on the instructions for the next interval (e.g., 10 seconds). The routing module 144 continues generating instructions for the next interval (e.g., based on current route data 182, map data 186, and sensor data 194), transmitting the instructions to the motion control module 146, and the motion control module controls the actuators based on the instructions.

In some implementations, the fuel-economy optimization module 142 can interface with routing module 144 and motion control module 146. The operations of fuel-economy optimization module 142 are further described below in conjunction with the following Figures.

The fuel-economy optimization module 142 identifies (e.g., retrieves from data repository 180 or receives from appropriate AV components or AV server) data, such as route data 182, topographic data 184, map data 186, vehicle data 188, historical data 192, sensor data 194, etc. The route data 182 may include a threshold arrival time.

The fuel-economy optimization module 142 retrieves fuel economy data 196 that is based on the vehicle data 188 of the AV 101 (e.g., fuel economy data 196 corresponding to the total AV mass of the AV 101, etc.). The fuel-economy optimization module 142 determines, based on the fuel economy data 196, a fuel efficient speed value for each segment of the route. In some implementations, the fuel economy data 196 is stored in a table (e.g., look-up table). The fuel-economy optimization module 142 determines the correlation of different speed values (e.g., mph) to different fuel economy values (e.g., mpg) for each segment of the route (e.g., based on the total AV mass, grade, wind, radius of curvature, etc.) and chooses the speed values (e.g., referred to as fuel efficient speed values) that have the best fuel economy values for each segment.

The fuel-economy optimization module 142 calculates, based on the route data 182 (e.g., distance value of each segment of the route) and the fuel-efficient speed value of each segment, an estimated arrival time (e.g., the sum of each distance value divided by a corresponding fuel-efficient speed value for the segments of the route).

Responsive to the estimated arrival time meeting the threshold arrival time (e.g., the AV 101 would arrive by the latest arrival time), the fuel-economy optimization module 142 generates a speed profile 198 that includes a fuel-efficient speed value for each segment of the route determined based on the fuel economy data 196.

Responsive to the estimated arrival time not meeting the threshold arrival time (e.g., the AV 101 would arrive after the latest arrival time), the fuel-economy optimization module 142 determines whether there are any segments that are a candidate for speed increase (e.g., determines whether any segment has a fuel-efficient speed value that has not met a regulatory maximum speed or a historical maximum speed based on historical traffic data).

Responsive to no segments being a candidate for speed increase, the fuel-economy optimization module 142 generates a speed profile 198 based on the fuel efficient speed values for each segment.

Responsive to the fuel-economy optimization module 142 identifying at least a subset of the segments that each represent a candidate for speed increase, the fuel-economy optimization module 142 computes, for each segment in the subset and based on the fuel economy data, a corresponding correlation metric that indicates a correlation between a change in fuel economy and a change in speed for a segment in the subset. For example, the correlation metric may indicate a decrease in mpg for different amounts of increase in mph. The fuel-economy optimization module 142 increases, for at least one segment from the subset and based on a respective correlation metric, a fuel-efficient speed value of a corresponding segment from the subset to provide the speed profile 198 reflecting the increased fuel-efficient speed value for the corresponding segment.

The AV 101 is controlled to travel along the route based on the speed profile 198. In some implementations, the AV 101 travelling the route based on the speed profile has an estimated arrival time that meets the threshold arrival time (e.g., AV 101 estimated to arrive at the destination by the latest arrival time, AV 101 is not to exceed the maximum trip time, etc.).

The fuel-economy optimization module 142 provides the speed profile 198 to the AVCS 140 (e.g., routing module 144 and/or motion control module 146) to control the vehicle systems 160 based on the speed profile 198. In some implementations, speed profile 198 is embedded in the map data 186 that is provided to the AVCS 140 (e.g., routing module 144).

In some implementations, the speed profile 198 includes additional data (e.g., gear ratio to be used, gear to be used, type of control of powertrain, type of braking, acceleration value, deceleration value, etc.) for one or more of the segments instead of or in addition to the fuel-efficient speed value for the segments of the route.

The use of the speed profile 198 provides fuel-economy optimization, such as decreasing wear-and-tear on the vehicle systems 160 of the AV 101, providing energy savings (e.g., an energy savings action), and/or the like. An energy saving action can refer to a vehicle action that results in reduction of energy consumed by an AV. With respect to an AV with an internal combustion engine (ICE), an energy saving action can include a fuel saving action. With respect to an AV with an electric engine (e.g., electric motor) or hybrid AV, an energy saving action can include a power or electricity saving action. In some implementations, an energy saving action can include at least one of a disengagement of a powertrain of the AV, a withholding of a supply of energy to an engine of the AV, or a regenerative energy action. Disengagement of a powertrain can include placing the AV in neutral gear (e.g. coasting) or decoupling the power of the engine from the wheels. Withholding a supply of energy to an engine of the AV 101 can include reducing or stopping fuel injection to the ICE or reducing or stopping the electricity provided to the electric engine (e.g., motor). A regenerative energy action can include an action that returns to or generates energy for the AV. A regenerative braking technique that returns energy to the AV through braking or other regenerative technique can be implemented. As used herein, fuel-economy optimization, fuel-efficient speed value, fuel-economy data, and the like may refer to any type of energy savings (e.g., savings of one or more of electricity, gasoline, diesel, biodiesel, natural gas, petroleum gas, methanol, ethanol, propane, hydrogen, regenerative energy, solar energy, etc.).

Figure 2:
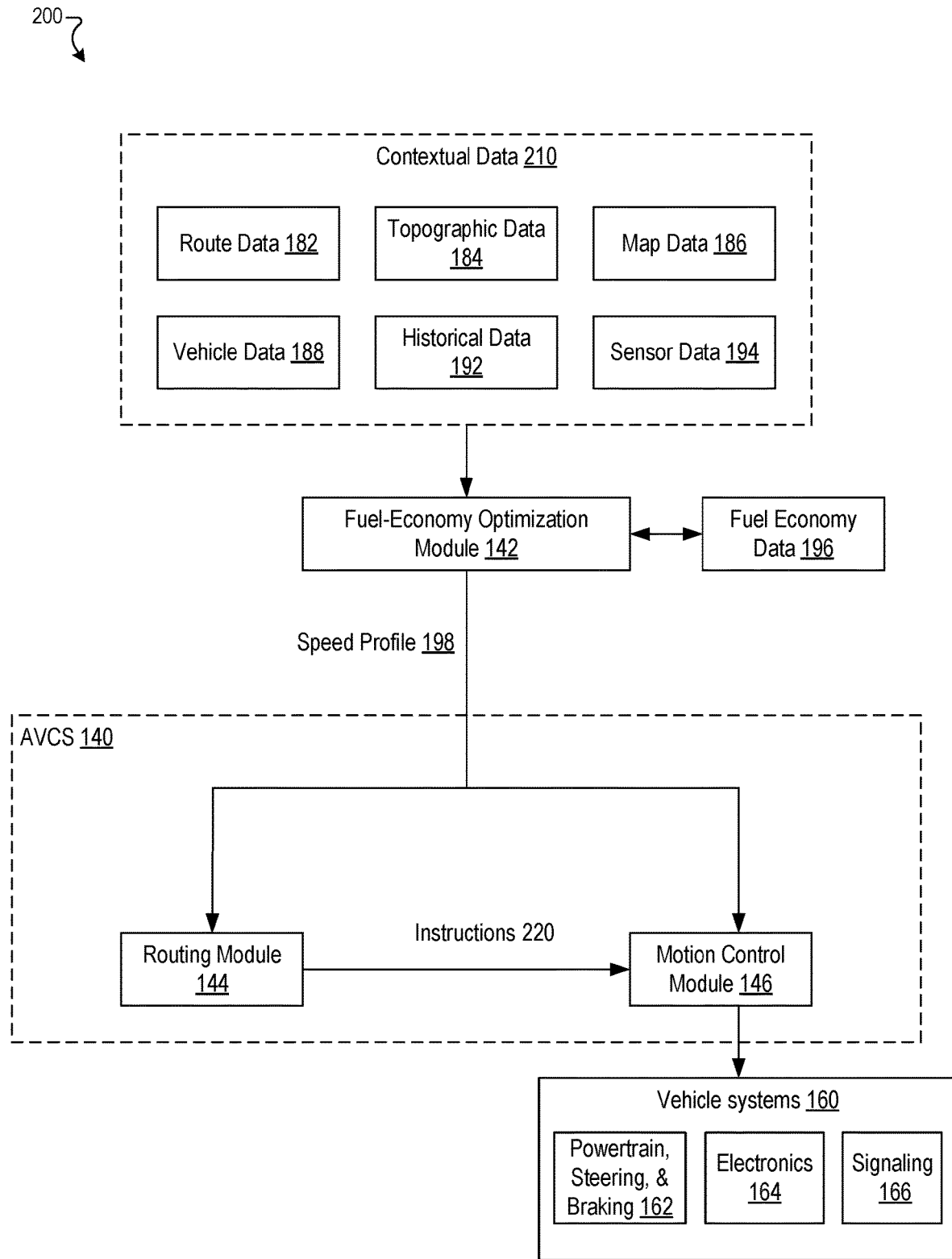
FIG. 2 is a diagram illustrating components of an example architecture of a system and example data flows pertaining to fuel-economy optimization, in accordance with some implementations of the disclosure.

FIG. 2 is a diagram illustrating components of an example architecture 200 of a system and example data flows pertaining to fuel-economy optimization, in accordance with some implementations of the disclosure. Components of FIG. 1 are used to help describe aspects of FIG. 2.

In some implementations, the fuel-economy optimization module 142 provides fuel-economy optimization for the AV. In some implementations, an AV server 150 includes the fuel-economy optimization module 142. In some implementations, the AVCS 140 of the AV includes the fuel-economy optimization module 142.

The fuel-economy optimization module 142 receives contextual data 210, such as one or more of route data 182, topographic data 184, map data 186, vehicle data 188, historical data 192, sensor data 194, and/or the like. The fuel-economy optimization module 142 retrieves a fuel economy data 196 based on at least a portion of the contextual data 210 (e.g., vehicle data 188). The fuel-economy optimization module 142 generates a speed profile 198 based on the contextual data 210 and fuel economy data 196. In some implementations, the speed profile 198 is a text file, a script, an executable binary file, and/or the like. In some implementations, the fuel-economy optimization module 142 embeds the speed profile 198 in other data, such as the map data 186. The fuel-economy optimization module 142 provides the speed profile 198 (e.g., alone, embedded in other data, etc.) to the routing module 144. In some implementations, the fuel-economy optimization module 142 provides the speed profile 198 to the routing module 144 and the motion control module 146.

In some implementations, routing module 144 is the primary authority and/or component involved in routing and decision making on positioning and operation of the AV. The routing module 144 receives data, such as the speed profile 198, route data 182, map data 186, and sensor data 194, and makes decision about the positioning of the AV with respect to the external environment based on the data received.

The routing module 144 generates instructions 220 (e.g., associated with moving the AV over the next 10 seconds) based on at least a portion of the speed profile 198 and transmits the instructions 220 to the motion control module 146. In some implementations, the instructions 220 are in a file (e.g., a text file, etc.) and the motion control module 146 generates commands (e.g., script) to control the vehicle systems 160 based on the instructions 220. In some implementations, the instructions 220 include commands (e.g., a script) and the motion control module 146 passes the commands (e.g., as received or after updating the commands) to the vehicle systems 160 to control the vehicles systems 160. The motion control module 146 executes the instructions 220 (e.g., commands, such as a speed value) based on the speed profile 198 (e.g., constraints, such as a speed value that may be different from the maximum speed limit or the minimum speed limit). In some implementations, the AVCS 140 controls the position of the AV based on a very strict tolerance (e.g., within a few centimeters from the requested position). For example, the AVCS 140 can evaluate received data (e.g., sensor data 194 indicating location of objects proximate the AV) and determine a position of the AV with respect to the external environment to move the AV. In some examples, the routing module 144 receives the sensor data 194 indicating that another vehicle is two seconds ahead of the AV. The routing module 144 then generates instructions 220 indicating that the braking system is to be actuated to cause the AV to be at least three seconds behind the other vehicle. In some implementations, the motion control module 146 is expected to execute the instructions 220 (e.g. in view of the speed profile 198) within the constraints imposed by the instructions 220 (e.g. in view of the speed profile 198) such that the position of the AV as determined by the AVCS 140 can be controlled with precision.

In some examples, speed profile 198 can indicate, for a segment of a route, a calculated maximum speed (e.g., that is less than a regulatory maximum speed), a type of braking, a gear ratio to be used, a rate of deceleration, and/or a lane in which to travel. The fuel-economy optimization module 142 can send at least a first portion of the speed profile 198 (e.g., the speed value, rate of deceleration, lane in which to travel, etc.) to the routing module 144 and at least a second portion of the speed profile 198 (e.g., type of braking, gear ratio, etc.) to the motion control module 146. The routing module 144 can generate instructions 220 for the next interval of time (e.g., 10 seconds) based on the at least a first portion of the speed profile 198 (e.g., calculated maximum speed, rate of deceleration, lane in which to travel, etc.). The motion control module 146 can control the vehicle systems 160 based on the at least a second portion of the speed profile 198 (e.g., type of braking and/or gear ratio of the speed profile 198) and based on the instructions 220.

Figure 3:
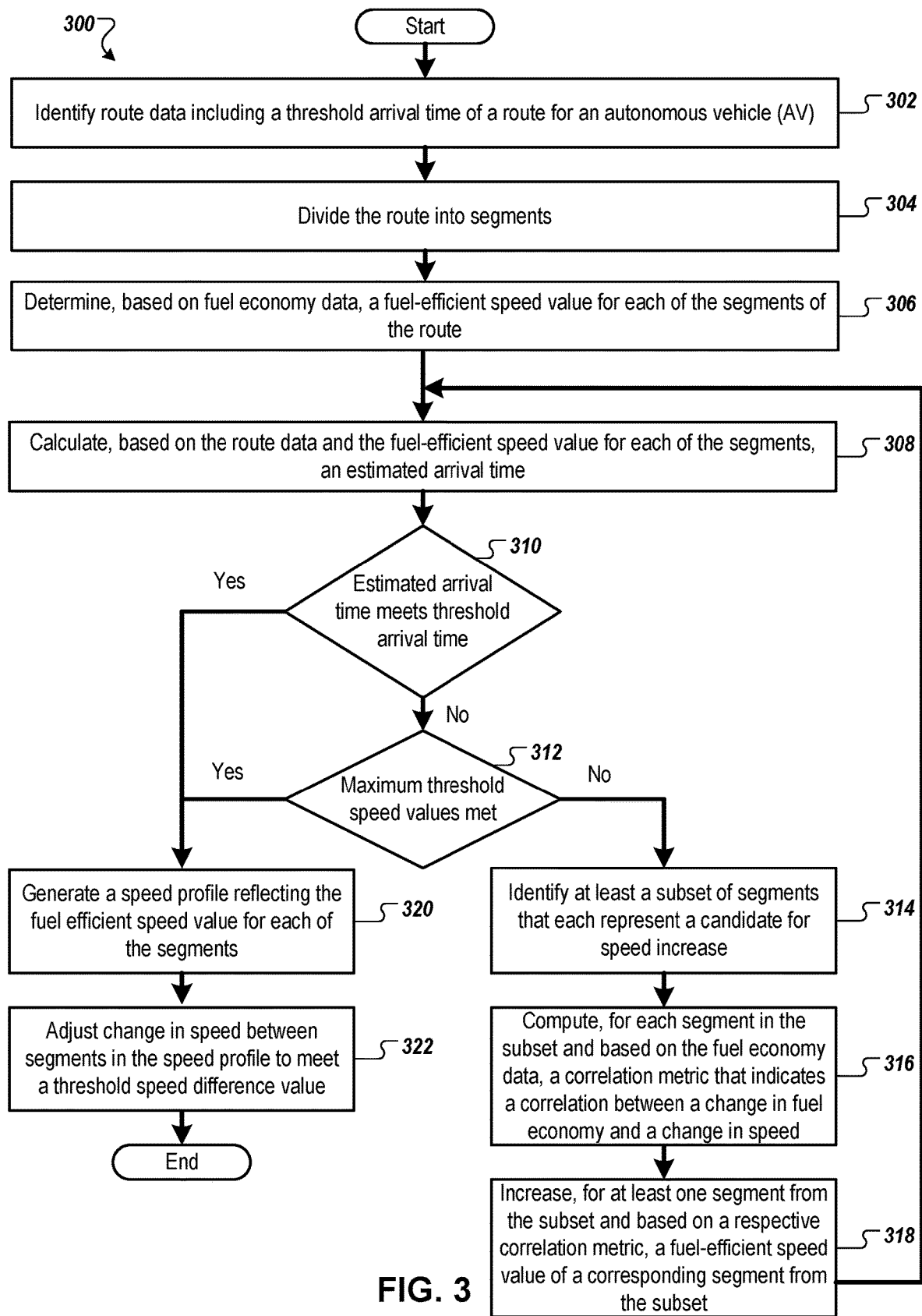
FIG. 3 depicts a flow diagram of an example method of performing fuel-economy optimization, in accordance with some implementations of the disclosure.

FIG. 3 depicts a flow diagram of an example method 300 of performing fuel-economy optimization, in accordance with some implementations of the disclosure. Method 300 and/or each of the individual functions, routines, subroutines, or operations of method 300 can be performed by a processing device, having one or more processing units (CPU) and memory devices communicatively coupled to the CPU(s). The processing device executing methods 300 can be part of a server (located outside an autonomous vehicle, such as AV server 150) or a client processing module (located within or at the autonomous vehicle, such as AVCS 140), or any combination thereof. In some implementations, method 300 can be performed by a single processing thread or alternatively by two or more processing threads, each thread executing one or more individual functions, routines, subroutines, or operations of the method. The method 300 as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 300 is performed by fuel-economy optimization module 142 described in FIGS. 1 and 2. Although shown in a particular sequence or order, unless otherwise specified, the order of the operations can be modified. Thus, the illustrated implementations should be understood only as examples, and the illustrated operations can be performed in a different order, while some operations can be performed in parallel. Additionally, one or more operations can be omitted in some implementations. Thus, not all illustrated operations are required in every implementation, and other process flows are possible. In some implementations, the same, different, fewer, or greater operations can be performed.

At operation 302, processing logic identifies route data including a threshold arrival time of a route for an AV. In some implementations, the threshold arrival time can include a departure time and a maximum trip time. In some implementations, the threshold arrival time can include a latest arrival time (e.g., latest arrival time allowed, cargo delivery deadline, etc.). In some implementations, the threshold arrival time can include a preference to travel during a particular time of day (e.g., drive during daylight hours and avoid driving at night, avoid driving during inclement weather conditions, etc.).

In some embodiments, the processing logic receives a starting location and destination location (e.g., via user input) that are within a mapped geography of the AV. The processing logic may determine a route (e.g., an optimal route) based on the starting location and destination location. The processing logic may further determine the route based on the threshold arrival time. The processing logic may further determine the route based on map data (e.g., from a map server). The processing logic may further receive topographic data (e.g., road profile information, such as length values and grade values), map data (e.g., regulatory speed limits, such as regulatory minimum speed limit and regulatory maximum speed limit), historical data (e.g., historical traffic data, historical wind data, etc.), and/or the like for different portions of the route. In some implementations, the route data includes the corresponding distance value, corresponding grade value, corresponding estimated wind value, etc. for each of the segments of the route. In some implementations, the route data includes a trip road profile which may include an elevation graph of the entire trip from the starting location to the destination location which allows for energy calculations as well as speed and time calculations.

At operation 304, processing logic divides the route into segments. In some implementations, each of the segments has a minimum threshold speed value and a maximum threshold speed value that are substantially constant over a length of the segment (e.g., a segment has constant regulatory speed limits, the segment has a constant historical maximum speed value based on traffic data). In some implementations, each of the segments has a corresponding grade that is substantially the same grade value over a length of the corresponding segment. In some implementations, each segment has a corresponding radius of curvature that is substantially the same over a length of the corresponding segment.

At operation 306, processing logic determines, based on fuel economy data, a corresponding fuel efficient speed value for each of the segments of the route. In some implementations, the fuel economy data is based on the vehicle data (e.g., total mass of the AV) and/or type of powertrain (e.g., different powertrains may have different fuel consumption at different speeds). In some implementations, the processing logic stores the fuel-efficient speed values in a speed profile (e.g., stored as a text file, a table, a script, etc.).

In some implementations, the fuel economy data includes input values including speed values, grade values, total mass values (e.g., combined tractor plus cargo mass), wind values, and/or the like. The fuel economy data may include output values of fuel economy values (e.g., specific fuel consumption values, mpg) collected from one or more AVs while driving based on the input values. The fuel economy data may be a fuel economy table. The input values and output values may be dimensions of the fuel economy table.

In some implementations, the fuel economy data is updated based on sensor data from the AV. For example, the processing logic may receive sensor data associated with the AV driving at a first speed value, determine a fuel economy value based on the sensor data, and cause the fuel economy data to be updated based on the first fuel economy value at the first speed value. In some implementations, the same fuel economy data is used by similar AVs (e.g., AVs that have substantially the same total AV mass, that have substantially the same type of power train, etc.). In some implementations, fuel economy data is personalized for a specific AV based on the sensor data of that AV. Responsive to fuel economy data for a specific AV being updated with a first fuel economy value that is not within a threshold range of fuel economy values associated with similar AVs, the processing logic may provide an alert. In some implementations, the alert indicates that the AV has a fuel economy that is not within a threshold range of similar AVs (e.g., maintenance is to be performed so that the AV can have a fuel economy within the threshold range of fuel economies of similar AVs). The fuel economy data may be updated (e.g., parameters of the fuel economy table may be updated) based on live measurements as the AV drives. This may optimize fuel economy for the specific AV. Issues with AVs over time may be diagnosed by determining differences (e.g., looking for major differences, identifying differences in fuel economy data) with respect to other AVs in the fleet.

In some implementations, the processing logic collects fuel consumption values from the AV while driving (e.g., the engine controller provides instantaneous fuel consumption). In some implementations, one or more similar AVs are driven (e.g., on an open or closed course) and data is collected across the range of the parameters of interest. The fuel economy data may be a high dimensional lookup table of fuel economy compared to other factors (e.g., road speed, road profile such as pitch, cargo weight, wind, etc.) that is created based on the data collected (e.g., fuel consumption values, speed values, etc.). The fuel economy data may take into account factors that change from trip to trip. In some implementations, the fuel economy data may not include factors that change over longer periods of time (e.g., to make it easier and faster to build the fuel economy data).

The fuel economy data can be used to optimize the fuel economy of an AV for any trip (e.g., route). Various inputs are sourced for the calibration of the fuel economy data, such as wind conditions along the route (e.g., via weather stations, via AVs, etc.), traffic conditions (e.g., via estimations, via historical data, etc.), total mass (e.g., cargo weighting which may be available on the e-bill of landing), road profile and condition (e.g., stored in a database as part of the base map), and/or the like.

The fuel economy data may indicate the most fuel efficient speed for an AV based on other conditions (e.g., grade value, wind value, etc.).

In some implementations, the processing logic determines a regulatory maximum speed value and a regulatory minimum speed value for each segment of the route (e.g., based on map data). The processing logic may further determine a historical maximum speed value for segments of the route based on historical traffic data. For example, the historical traffic data may indicate a historical maximum speed value for particular segments (e.g., at particular times, such as rush hour) that is less than a regulatory maximum speed value. The processing logic may update the fuel-efficient speed values based on minimum threshold speed values (e.g., regulatory minimum speed values) and maximum threshold speed values (e.g., regulatory maximum speed values, historical maximum speed values). For example, if the processing logic determines a fuel-efficient speed value of 30 mph based on the fuel economy data and a minimum threshold speed value of 35 mph, the processing logic may update the fuel-efficient speed value to be 35 mph. In some implementations, the processing logic updates (e.g., replaces) the fuel-efficient speed values included in a speed profile.

In some implementations, the regulatory minimum speed value (e.g., minimum legal limits on vehicle speed) is a minimum speed that the AV is allowed to travel on a particular section of road. In some implementations, the regulatory minimum speed is a constraint that cannot normally be broken, except during circumstances such as adverse weather conditions or heavy traffic. In some implementations, the regulatory maximum speed value (e.g., maximum legal limits on vehicle speed) is a maximum speed that a truck is allowed to travel on a particular section of road (e.g., a hard constraint that cannot be broken).

In some implementations, the processing logic further determines the maximum threshold speed values and the minimum threshold speed values based on environmental and vehicle factors, such as one or more of wind, tire wear, tire pressure, road surface condition, engine and transmission type and condition, and/or the like.

At operation 308, processing logic calculates, based on the route data and the corresponding fuel-efficient speed value for each of the segments, an estimated arrival time.

To calculate the estimated arrival time, the processing logic may perform route segment integration based on a corresponding length of each of the segments and a fuel-efficient speed value for each of the segments. In some implementations, in order to perform route segment integration, the processing logic determines a segment travel time for each segment of the route by dividing the distance value of each segment by the fuel-efficient speed value for each segment and then adds together each segment travel time to determine a total travel time to travel the route. The estimated arrival time may also include a buffer (e.g., a 10% buffer). The estimated arrival time may be the departure time plus the total amount of time to travel the route plus a buffer.

At operation 310, processing logic determines whether the estimated arrival time meets the threshold arrival time. Responsive to the estimated arrival time meeting the threshold arrival time (e.g., the AV is estimated to arrive at or before the arrival time deadline), the flow continues to operation 320. Responsive to the estimated arrival time not meeting the threshold arrival time (e.g., the AV is estimated to arrive after the arrival time deadline), the flow continues to operation 312.

At operation 314, processing logic determines whether the corresponding fuel-efficient speed value for each of the segments meets a corresponding maximum threshold speed value for the corresponding segment. For example, the processing logic may determine whether all of the fuel-efficient speed values for the segments are the same as either a corresponding regulatory maximum speed value for the corresponding segment or a corresponding historical maximum speed value for the corresponding segment (e.g., the vehicle speed are clamped to the maximum limits across all route segments). Responsive to the corresponding maximum threshold speed values being met, flow continues to operation 320. Responsive to the maximum threshold speed values for all of the segments not being met (e.g., the fuel-efficient speed value for at least one of the segments does not meet a corresponding maximum threshold speed value), flow continues to operation 314.

At operation 314, processing logic identifies at least a subset of segments that each represent a candidate for speed increase. In some implementations, the subset of segments that each represent a candidate for speed increase are each of the segments that have a fuel-efficient speed value that is less than a corresponding maximum threshold speed value. In some implementations, the subset of segments are further limited (e.g., segments that have at least a threshold distance, at least a threshold difference between fuel-efficient speed value and maximum threshold speed value, etc.).

At operation 316, processing logic computes, for each segment in the subset and based on the fuel economy data, a correlation metric that indicates a correlation between a change in fuel economy and a change in speed. In some implementations, the different fuel economies are interpolated between points. The correlation metric is based on the decrease of fuel economy for an increase in speed. For example, a speed value increase of 5 mph for a first segment of the route may decrease fuel economy (e.g., miles per gallon (mpg)) for the first segment by a first value and a speed value increase of 5 mph for a second segment may decrease fuel economy for the second segment by a second value. In some implementations, the correlation metric is based on differences between data points. In some implementations, an equation is fit to the data points (e.g., fuel economy values and speed values) and the correlation metric is a derivative of the equation. In some implementations, the correlation metric is a mathematical derivative of the data points (e.g., fuel economy values and speed values), such as a difference in mpg compared to difference in mph.

At operation 318, processing logic increases, for at least one segment from the subset and based on a respective correlation metric, a fuel-efficient speed value of a corresponding segment from the subset. One or more fuel-efficient speed values may be increased based on the correlation metrics. Increasing one or more fuel-efficient speed values in operation 318 allows the AV to drive faster (e.g., meet the threshold arrival time) in the most efficient manner. In some implementations, the processing logic includes the increased fuel-efficient speed values in a speed profile.

After operation 318, flow returns to operation 310 for recomputing the estimated arrival time based on the route data and the new fuel-efficient speed values (e.g., included in the speed profile). In some implementations, the processing logic adjusts the corresponding fuel-efficient speed values until local minima are found that minimize the amount of fuel that is to burn (e.g., to meet the threshold arrival time) based on factors the user cannot control.

At operation 320, processing logic generates (e.g., provides) a speed profile (e.g., a text file, a script, etc.) reflecting the fuel-efficient speed value for each of the segments. In some implementations, the speed profile is generated based on more than one optimization parameter (e.g., more than just topologic data). In some implementations, the speed profile includes one or more fuel-efficient speed values from the fuel economy data. In some implementations, the speed profile includes one or more fuel-efficient speed values that have been increased to meet a minimum threshold speed value (e.g., regulatory minimum speed value) compared to the fuel economy data. In some implementations, the speed profile includes one or more fuel-efficient speed values that have been decreased to meet a maximum threshold speed value (e.g., regulatory maximum speed value, historical maximum speed value) compared to the fuel economy data. In some implementations, the speed profile includes one or more fuel-efficient speed values that have been increased to meet the threshold arrival time. In some implementations, the speed profile includes additional information (e.g., transmission gear to be used, type of braking, etc.) in addition to or instead of speed values for one or more segments of the route.

In some implementations, at operation 322, processing logic adjusts change in speed between segments in the speed profile to meet a threshold speed difference value. For example, the processing logic may determine, based on the speed profile, that a difference between a first fuel-efficient speed value of a first segment of the route and a second fuel-efficient speed value of a subsequent segment of the route exceeds a threshold speed difference value. The processing logic may adjust change in speed (e.g., gradually accelerate or decelerate, apply a smoothing function to avoid sudden speed changes) between the first segment and the subsequent segment in the speed profile to meet the threshold speed difference value. In some implementations, the speed profile is the set of speeds that provides the lowest integral fuel burn over the entire route. The AV is to travel along the route based on the speed profile.

In some implementations, the processing logic repeats one or more of operations 302-322 to update the speed profile (e.g., continuously analyze the lower bound of vehicle speed that would still have the vehicle arrive on time). In some implementations, as the AV drives along the route, one or more parameters from method 300 (e.g., the initial route optimization calculation) change, such as changes in estimates of wind and traffic, updates to the fuel economy data, changes to the route (e.g., given new road blockage information), etc. As these changes are registered, the processing logic (e.g., at the AV server, at the AV, etc.) may re-run method 300 (e.g., the same optimization process) and/or the generation of the fuel economy data to generate an updated speed profile so that the AV continues driving the route in the most optimal manner. In some implementations, the frequency of this computation (e.g., re-running method 300, updating the fuel economy data, etc.) may be adjusted and may be triggered by certain events, such as large changes to one or more of the input parameters (e.g., wind and traffic estimates, route changes, fuel economy data updates, etc.) to avoid computation when the speed profile would not change significantly. The route data may include dynamic variables, such as wind data, weather data, traffic data, road closure data, etc. The dynamic variables of the route data may be updated (e.g., continuously updated) and one or more of blocks 302-322 of method 300 may be repeated with the updated route data (e.g., updated wind data, updated weather data, updated traffic data, updated road closure data, etc.).

In some implementations, over time the conditions of the AV change (e.g., engine and/or transmission efficiency, tire wear, etc.) which may have effects on the fuel efficiency at different operating conditions. As the changes occur, the processing logic may update the fuel economy data of the AV with new values that are continuously collected by monitoring specific fuel consumption and updating the appropriate portions of the fuel economy data related to the current operating condition of the AV. Updates to the fuel economy data allow each AV in an AV fleet to optimize itself, such that the fleet as a whole is fully optimized.

In some implementations, a reasonable band of fuel economy data values is determined (e.g., by a fleet management server) over time for a fleet of AVs (e.g., AV tractors). The fleet management server can use this information to compare against specific AVs within the fleet and confirm whether each AV is operating within the reasonable band (e.g., some determined band of the norm). If an AV does not meet a threshold value (e.g., is particularly far away from the average values), the AV can be automatically tagged for inspection to figure out what is wrong with the particular vehicle. By tightening the band, fuel efficiency issues in the fleet of AVs can be identified early on before the issues result in large costs. In some implementations, after collecting data, the AVs that have achieved the best fuel economy of the fleet of AVs can be inspected to identify factors which contributed to the high fuel economy. If these factors are within control (e.g., aerodynamic fairings, tire pressure, tire wear), these factors can be adjusted across the fleet of AVs.

In some embodiments, the processing logic determines, based on sensor data (e.g., from perception system) that there are no upcoming uphill grades for a particular segment (e.g., multiple miles) and there are no vehicles behind the AV during that segment. The processing logic then updates the speed profile to slow the AV to go into a low performance state (e.g., slower speed since the AV should not be requested to have a sudden increase in torque).

In some implementations, instead of the processing logic first determining a fuel-efficient speed value for each of the segments of the route (e.g., block 306 of method 300) and then revising the fuel-efficient speed values (e.g., block 318 of method 300), the processing logic determines an estimated arrival time (e.g., prior to optimizing speed values based on fuel economy data) and then optimizes speed values based on fuel economy data. The estimated arrival time may be based on speed values (e.g., a preliminary speed profile) for the segments of the route. In some implementations, each of the speed values (e.g., average speed values, regulatory speed values, maximum and/or minimum speed values, etc.) for segments of the route could be decreased or increased proportionally to meet a threshold arrival time (e.g., each speed value is decreased by 5% to arrive at the threshold arrival time, each speed value is increased by 3% to arrive by the threshold arrival time, etc.).

After having speed values for segments of the route that meet the threshold arrival time, the processing logic may optimize the speed values (e.g., for fuel economy). For example, the processing logic may determine a first subset of segments that each represent a candidate for speed increase (e.g., similar to block 314 of method 300) and the processing logic may determine a second subset of segments that each represent a candidate for speed decrease (e.g., are not less than a minimum threshold speed value). The processing logic may compute, for each segment in the first subset and the second subset and based on the fuel economy data, a correlation metric that indicates a correlation between a change in fuel economy and a change in speed (e.g., similar to block 316 of method 300). The processing logic may increase, for at least one segment from the first subset and based on a respective correlation metric, a fuel-efficient speed value of the corresponding segment from the first subset (e.g., similar to block 318 of method 300) and the processing logic may decrease, for one or more segments from the second subset and based on a corresponding correlation metric, a fuel-speed value of the respective segment from the second subset. The processing logic may adjust (e.g., increase or decrease) different fuel-speed values while still meeting the threshold arrival time (e.g., the original estimated arrival time). For example, the processing logic may decrease the speed value of a first segment (e.g., where the AV has lower fuel economy) and may increase the speed value of a second segment (e.g., where the AV has a higher fuel economy) to still meet a threshold arrival time. The processing logic adjusts (e.g., increases, decreases) speed values until the processing logic identifies a set of speed values (e.g., fuel efficient speed values) that provide an optimized (e.g., best) fuel economy (e.g., least amount of fuel used) for the route while still meeting the threshold arrival time and meeting maximum threshold speed values and minimum threshold speed values (e.g., not exceeding maximum regulatory speed value, not exceeding a maximum traffic speed value, not exceeding a maximum weather speed value, not being less than a minimum regulatory speed value, etc.). The processing logic may generate a speed profile reflecting the speed value (e.g., fuel efficient speed value) for each of the segments (e.g., similar to block 320 of method 300). The processing logic may adjust change in speed between segments in the speed profile to meet a threshold speed difference value (e.g., similar to block 322 of method 300).

Figure 4:
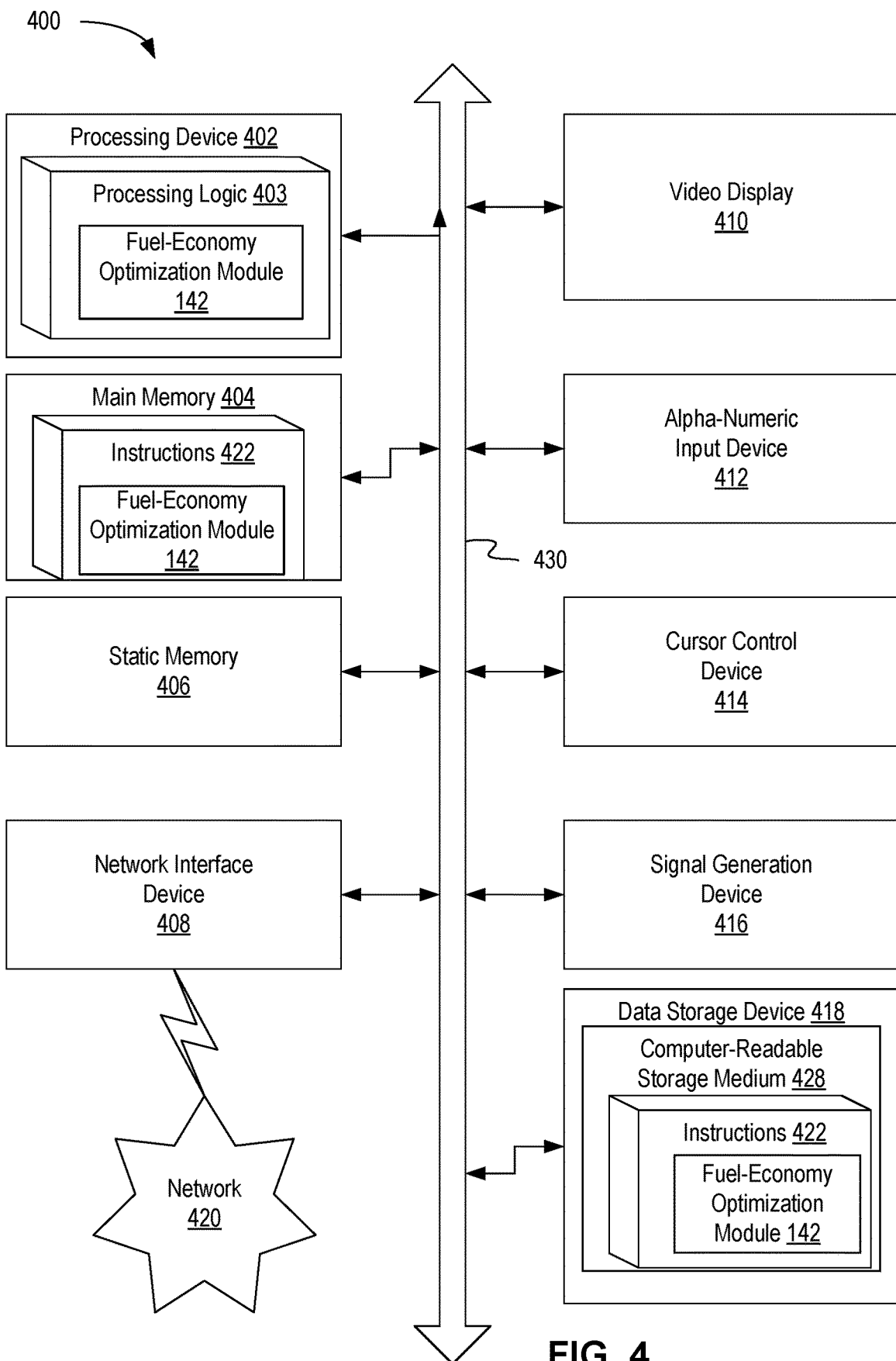
FIG. 4 depicts a block diagram of an example computer device within which a set of instructions, for causing the machine to perform any of the one or more methodologies discussed herein can be executed, in accordance with some implementations of the disclosure.

FIG. 4 depicts a block diagram of an example computer device 400 within which a set of instructions, for causing the machine to perform any of the one or more methodologies discussed herein can be executed, in accordance with some implementations of the disclosure. Example computer device 400 can be connected to other computer devices in a LAN, an intranet, an extranet, and/or the Internet. Computer device 400 can operate in the capacity of a server in a client-server network environment. Computer device 400 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" includes any collection of computers that individually or jointly execute a set (or multiple sets) of instructions to perform any one or more of the methods discussed herein. In some implementations, the computer device 400 is AV server 150. In some implementations, the AV 101 includes computer device 400 (e.g., AVCS 140 is computer device 400). In some implementations, computer device 400 executes the fuel-economy optimization module 142.

Example computer device 400 can include a processing device 402 (also referred to as a processor or CPU), which can include processing logic 403, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a secondary memory (e.g., a data storage device 418), which can communicate with each other via a bus 430.

Processing device 402 represents one or more general-purpose processing devices such as a microprocessor, central processing unit, or the like. More particularly, processing device 402 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 402 can be configured to execute instructions performing any of the operations performed by fuel-economy optimization module 142.

Example computer device 400 can further comprise a network interface device 408, which can be communicatively coupled to a network 420. Example computer device 400 can further comprise a video display 410 (e.g., a liquid crystal display (LCD), a touch screen, or a cathode ray tube (CRT)), an alphanumeric input device 412 (e.g., a keyboard), a cursor control device 414 (e.g., a mouse), and an acoustic signal generation device 416 (e.g., a speaker).

Data storage device 418 can include a computer-readable storage medium (or, more specifically, a non-transitory computer-readable storage medium) 428 on which is stored one or more sets of executable instructions 422. In accordance with one or more aspects of the disclosure, executable instructions 422 can comprise executable instructions to perform any of the operations of fuel-economy optimization module 142.

Executable instructions 422 can also reside, completely or at least partially, within main memory 404 and/or within processing device 402 during execution thereof by example computer device 400, main memory 404 and processing device 402 also constituting computer-readable storage media. Executable instructions 422 can further be transmitted or received over a network via network interface device 408.

While the computer-readable storage medium 428 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" includes any medium that is capable of storing or encoding a set of instructions for execution by the machine that cause the machine to perform any one or more of the methods described herein. The term "computer-readable storage medium" includes, but is not limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment," "one embodiment," "some embodiments," "an implementation," "one implementation," "some implementations," or the like throughout may or may not mean the same embodiment or implementation. One or more embodiments or implementations described herein may be combined in a particular embodiment or implementation. The terms "first," "second," "third," "fourth," etc. as used herein are meant as labels to distinguish among different elements and may not necessarily have an ordinal meaning according to their numerical designation.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   determining, by a processing device associated with an autonomous vehicle (AV), that an estimated arrival time of the AV arriving at a destination via a route exceeds a threshold arrival time of the AV arriving at the destination via the route;
   increasing, by the processing device based on a correlation metric associated with a correlation between a fuel economy and a speed, a fuel-efficient speed value of a corresponding segment of the route to provide a speed profile reflecting the increased fuel-efficient speed value of the corresponding segment of the route; and
   causing, by the processing device, the AV to travel along the route based on the speed profile.

2. The method of claim 1 further comprising:
   determining, based on fuel economy data associated with the AV, a corresponding fuel-efficient speed value for each of a plurality of segments of the route; and
   calculating, based on route data for the route of the AV and the corresponding fuel-efficient speed value for each of the plurality of segments of the route, the estimated arrival time of the AV arriving at the destination.

3. The method of claim 2 further comprising determining, based on regulatory speed limits and traffic data, a corresponding minimum threshold speed value and a corresponding maximum threshold speed value for each of the plurality of segments of the route, wherein the corresponding fuel-efficient speed value for one or more of the plurality of segments is further based on at least one of the corresponding minimum threshold speed value or the corresponding maximum threshold speed value.

4. The method of claim 2, wherein the fuel economy data comprises:
   a first fuel economy value associated with driving based on a first speed value; and
   a second fuel economy value associated with driving based on a second speed value, wherein the fuel economy is based on the first fuel economy value and the second fuel economy value, and wherein the speed is based on the first speed value and the second speed value.

5. The method of claim 4, wherein the first fuel economy value is further based on one or more of a first grade value, a first total AV mass value, or a first wind value.

6. The method of claim 2 further comprising:
   determining, based on first sensor data associated with the AV driving at a first speed value, a first fuel economy value;
   and
   responsive to the first fuel economy value not being within a threshold range of fuel economy values associated with a plurality of AVs driving at the first speed value, providing an alert.

7. The method of claim 1 further comprising:
   identifying, among a plurality of segments of the route, at least a subset of segments that each represent a candidate for speed increase; and
   computing, for each segment in the at least a subset and based on fuel economy data, a corresponding correlation metric that indicates the correlation between the fuel economy and the speed for a respective segment in the at least a subset.

8. The method of claim 7 further comprising:
   determining, based on regulatory speed limits and traffic data, a plurality of minimum threshold speed values and a plurality of maximum threshold speed values for the route; and
   dividing, based on the plurality of minimum threshold speed values and the plurality of maximum threshold speed values, the route into the plurality of segments, wherein each of the plurality of segments has a corresponding minimum threshold speed value and a corresponding maximum threshold speed value that are substantially constant.

9. The method of claim 7 further comprising determining, based on regulatory speed limits and traffic data, a maximum threshold speed value for each of the plurality of segments, wherein a corresponding fuel-efficient speed value of each of the at least a subset of segments is below a corresponding maximum threshold speed value.

10. The method of claim 7, wherein the corresponding segment from the at least a subset has the respective correlation metric that indicates least decrease in fuel economy compared to increase in speed.

11. The method of claim 1 further comprising:
determining, based on the speed profile, that a difference between a first fuel-efficient speed value of a first segment of the route and a second fuel-efficient speed value of a subsequent segment of the route exceeds a threshold speed difference value; and
adjusting the speed between the first segment and the subsequent segment in the speed profile to meet the threshold speed difference value.

12. A system comprising:
a memory device; and
a processing device, coupled to the memory device, wherein the processing device is to:
determine that an estimated arrival time of an autonomous vehicle (AV) arriving at a destination via a route exceeds a threshold arrival time of the AV arriving at the destination via the route;
increase, based on a correlation metric associated with a correlation between a fuel economy and a speed, a fuel-efficient speed value of a corresponding segment of the route to provide a speed profile reflecting the increased fuel-efficient speed value of the corresponding segment of the route; and
cause the AV is to travel along the route based on the speed profile.

13. The system of claim 12, wherein the processing device is further to:
determine, based on fuel economy data associated with the AV, a corresponding fuel-efficient speed value for each of a plurality of segments of the route; and
calculate, based on route data for the route of the AV and the corresponding fuel-efficient speed value for each of the plurality of segments of the route, the estimated arrival time of the AV arriving at the destination.

14. The system of claim 12, wherein the processing device is further to:
identify, among a plurality of segments of the route, at least a subset of segments that each represent a candidate for speed increase; and
compute, for each segment in the at least a subset and based on fuel economy data, a corresponding correlation metric that indicates the correlation between the fuel economy and the speed for a respective segment in the at least a subset.

15. The system of claim 14, wherein the corresponding segment from the at least a subset has the respective correlation metric that indicates least decrease in fuel economy compared to increase in speed.

16. The system of claim 12, wherein the processing device is further to:
determine, based on the speed profile, that a difference between a first fuel-efficient speed value of a first segment of the route and a second fuel-efficient speed value of a subsequent segment of the route exceeds a threshold speed difference value; and
adjust the speed between the first segment and the subsequent segment in the speed profile to meet the threshold speed difference value.

17. A non-transitory computer-readable storage medium having instructions stored thereon that, when executed by a processing device, cause the processing device to:
determine that an estimated arrival time of an autonomous vehicle (AV) arriving at a destination via a route exceeds a threshold arrival time of the AV arriving at the destination via the route;
increase, based on a correlation metric associated with a correlation between a fuel economy and a speed, a fuel-efficient speed value of a corresponding segment of the route to provide a speed profile reflecting the increased fuel-efficient speed value of the corresponding segment of the route; and
cause the AV is to travel along the route based on the speed profile.

18. The non-transitory computer-readable storage medium of claim 17, wherein the processing device is further to:
determine, based on fuel economy data associated with the AV, a corresponding fuel-efficient speed value for each of a plurality of segments of the route; and
calculate, based on route data for the route of the AV and the corresponding fuel-efficient speed value for each of the plurality of segments of the route, the estimated arrival time of the AV arriving at the destination.

19. The non-transitory computer-readable storage medium of claim 17, wherein the processing device is further to:
identify, among a plurality of segments of the route, at least a subset of segments that each represent a candidate for speed increase; and
compute, for each segment in the at least a subset and based on fuel economy data, a corresponding correlation metric that indicates the correlation between the fuel economy and the speed for a respective segment in the at least a subset.

20. The non-transitory computer-readable storage medium of claim 17, wherein the processing device is further to:
determine, based on the speed profile, that a difference between a first fuel-efficient speed value of a first segment of the route and a second fuel-efficient speed value of a subsequent segment of the route exceeds a threshold speed difference value; and
adjust the speed between the first segment and the subsequent segment in the speed profile to meet the threshold speed difference value.

\* \* \* \* \*